(12) United States Patent
Krajenke et al.

(10) Patent No.: US 8,646,762 B2
(45) Date of Patent: Feb. 11, 2014

(54) EXTENSION SPRING INSTALLATION MECHANISM

(75) Inventors: Gary W. Krajenke, Warren, MI (US); Alvin N. Standard, Clarkston, MI (US); Edward L. Schulte, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 195 days.

(21) Appl. No.: 13/267,176

(22) Filed: Oct. 6, 2011

(65) Prior Publication Data

US 2013/0087956 A1    Apr. 11, 2013

(51) Int. Cl.
*F16F 1/06*    (2006.01)

(52) U.S. Cl.
USPC .......................................... 267/170; 267/179

(58) Field of Classification Search
USPC ............... 267/69, 73, 74, 169, 172, 174, 175, 267/176, 177, 178, 179; 29/225, 230, 227, 29/238, 239; 296/76; 16/289, 400, 401; 411/88, 89, 114, 115, 132, 133, 136, 411/138, 141, 143, 144, 146, 166, 145, 187, 411/188
See application file for complete search history.

(56) References Cited

U.S. PATENT DOCUMENTS

| | | | |
|---|---|---|---|
| 2,037,586 A * | 4/1936 | Olson | 411/188 |
| 2,265,629 A * | 12/1941 | Christiansen | 267/175 |
| 2,272,230 A | 2/1942 | VanVoorhees | |
| 2,684,238 A * | 7/1954 | Robinson | 267/73 |
| 3,024,488 A | 3/1962 | Germann | |
| 3,041,060 A * | 6/1962 | Jacobsen | 267/177 |
| 4,529,179 A * | 7/1985 | Seyler | 267/287 |
| 4,549,325 A * | 10/1985 | Seyler | 470/42 |
| 4,776,626 A * | 10/1988 | Seyler | 296/76 |
| 5,540,417 A * | 7/1996 | Spencer | 267/28 |
| 5,557,829 A | 9/1996 | Schoen et al. | |
| 5,722,645 A * | 3/1998 | Reitter | 267/177 |
| 6,213,235 B1 | 4/2001 | Elhardt et al. | |
| 6,618,904 B1 | 9/2003 | Nagy | |
| 6,701,574 B2 | 3/2004 | Hashim et al. | |
| 6,736,440 B1 | 5/2004 | Hashim et al. | |
| 6,868,930 B2 | 3/2005 | Brogly et al. | |
| 6,892,423 B2 | 5/2005 | Cheal et al. | |
| 7,093,877 B2 | 8/2006 | Duffy | |
| 7,350,845 B1 | 4/2008 | Duffy | |
| 7,546,663 B2 | 6/2009 | Duffy | |
| 7,661,914 B2 * | 2/2010 | Liu | 411/141 |
| 7,730,584 B2 | 6/2010 | Duffy | |
| 8,136,801 B2 * | 3/2012 | Goldberg | 267/177 |

* cited by examiner

*Primary Examiner* — Bradley King
*Assistant Examiner* — Nicholas J Lane

(57) ABSTRACT

A spring installation mechanism includes a bracket fixed against displacement, a spring that extends along an axis and includes first and second ends, the second end being fixed against displacement, a retainer secured to the first end and including helical threads, and a screw including a shank having helical threads engaged with the threads of the retainer, axial displacement of the screw toward the retainer limited by contact with the bracket, said contact permitting rotary displacement of the screw relative to the retainer and the spring.

17 Claims, 3 Drawing Sheets

EXTENSION SPRING INSTALLATION MECHANISM

BACKGROUND OF INVENTION

The present invention relates generally to an apparatus to assist an operator in installing an extension spring in a motor vehicle, particularly an extension spring for a deck lid hinge.

Extension springs are typically used to provide the counterbalance performance of deck lid hinges in motor vehicles.

Current motor vehicles with extension springs require a sufficiently low magnitude of force to install the springs that the operator can complete the installation without use of any special tools. But new vehicle applications, which require higher installation forces than operator limitations, often require complex, external point of installation tools and devices, such as hydraulic or pneumatic cylinders, to complete the installation.

Due to a desire to improve the counterbalance performance of deck lid hinges, springs having a larger spring constant are required. These springs produce higher spring forces in the deck lid assembly.

In such instances, special tools that hold the spring in an extended position can be used that allow for higher installation forces. These tools have to be closely reviewed to avoid potential for the spring to disengage during installation, since they are under high loads.

A need exists in the industry for an extension spring tool or system that enables the operator in high installation force applications to install a deck lid hinge spring in the vehicle such that the required installation forces are below the human factor criteria for spring installation.

SUMMARY OF INVENTION

A spring installation mechanism includes a bracket fixed against displacement, a spring that extends along an axis and includes first and second ends, the second end being fixed against displacement, a retainer secured to the first end and including helical threads, and a screw including a shank having helical threads engaged with the threads of the retainer, axial displacement of the screw toward the retainer limited by contact with the bracket, with the contact permitting rotary displacement of the screw relative to the retainer and the spring.

The spring is installed in a motor vehicle by securing against displacement a bracket on the vehicle body, securing against displacement a first end of the spring to a deck lid strap, connecting a second end of the spring to a retainer, engaging threads of a screw with threads of the retainer, securing the screw against axial displacement by attaching the screw to the bracket, and rotating the screw in a first direction that draws the retainer toward the bracket and extends the spring.

The mechanism enables the assembly plant to install a spring in a vehicle such that the forces required to perform the installation are lower than the human factor criteria or maximum allowed for spring installation. The mechanism accommodates springs having a relatively high spring constant, thereby allowing for improved counterbalance performance of the deck lid hinges.

The system can allow the operator to apply no force when installing the spring into a deck lid hinge assembly. Special features prevent the spring from backing off of screw threads during normal cycle events, allow for low installation force, and provide high retention force connections of the spring to a cupped threaded member.

The mechanism can provide infinite adjustments, if required, by either increasing or decreasing the installation forces by turning a threaded screw member in or out. The mechanism can allow for added mass (such as spoilers or bright bars) to be added to the deck lid, and provides for adjustment to compensate for this additional mass.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DETAILED DESCRIPTION

Figure 1:
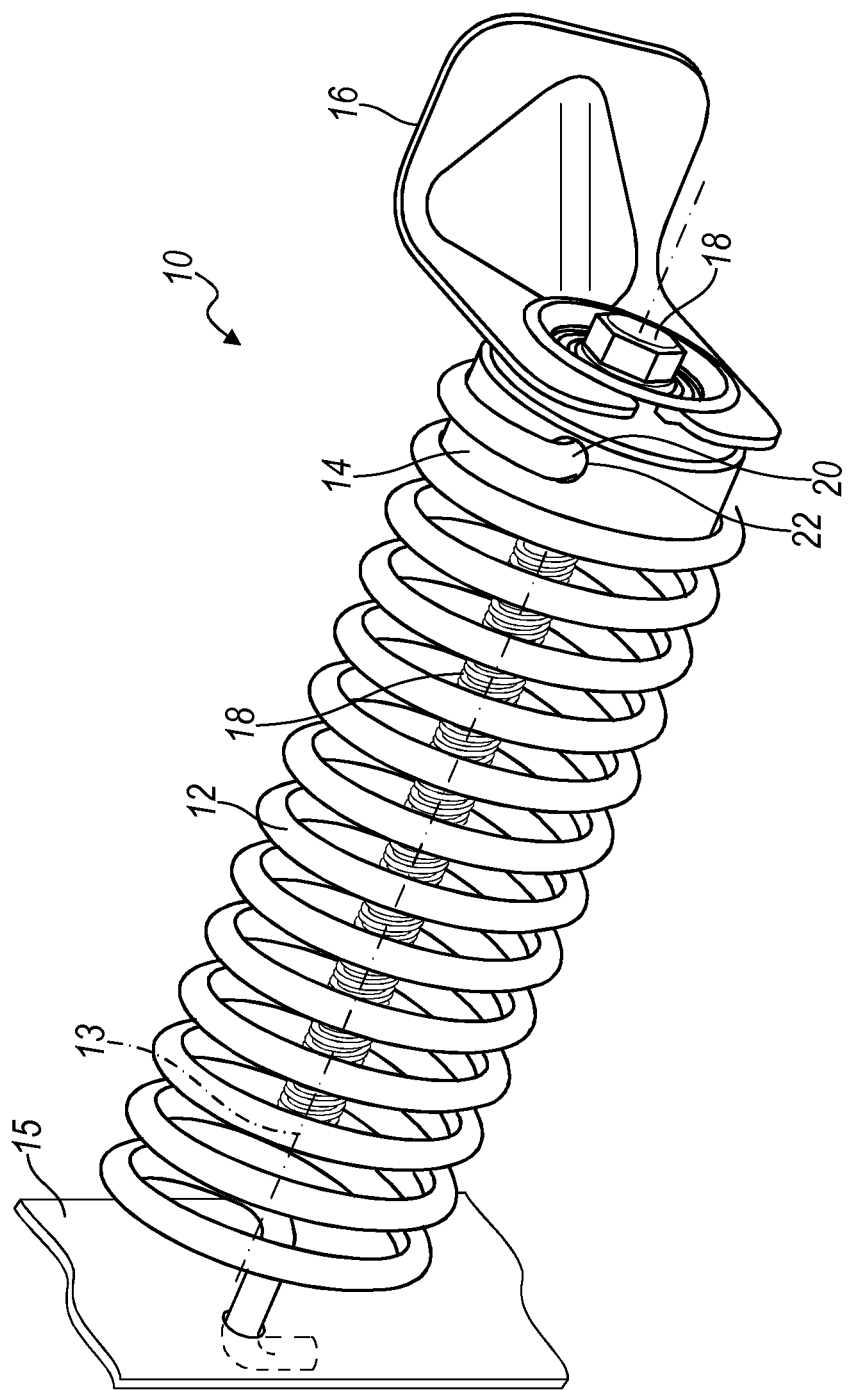
FIG. 1 is a perspective side view showing a spring tensioning mechanism having extended the spring.

Referring now to the drawings, FIG. 1 shows a spring tensioning mechanism 10, a helical coiled, tension spring 12 extending along an axis 13; a retainer 14, to which the spring 12 is secured; a bracket 16, which is secured to the vehicle body; and an adjusting screw 18 including external threads engaged with internal threads formed on the retainer 14. The adjusting screw 18 also extends along axis 13. The end coil of spring 12 is formed with a hook 20, which is fitted into a hole 22 formed in the retainer 14. The opposite end of spring 12 is secured to a deck lid hinge strap 15. The deck lid opens and closes access to the passenger compartment from the rear of the vehicle.

Figure 2:
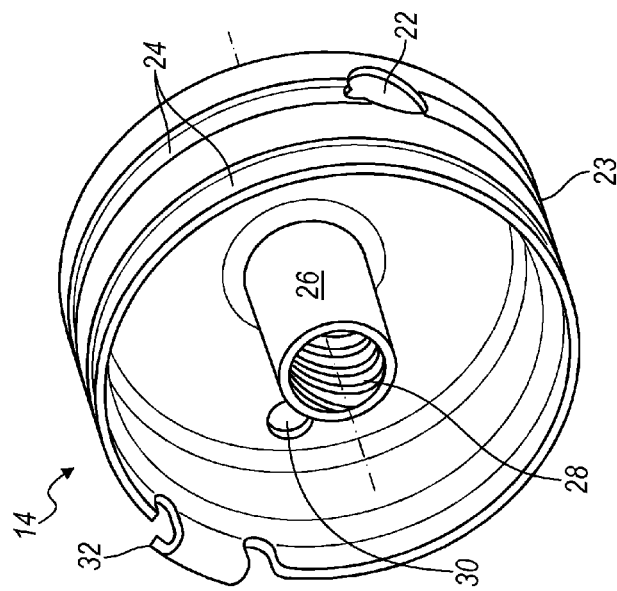
FIG. 2 is a perspective side view showing the interior of the retainer.

FIG. 2 shows that retainer 14 includes a cylinder 23 extending along the axis, and a concave, helical recess 24, formed in the outer surface of the cylinder for receiving coils near the end of the spring 12; an axially extending projection 26, which is formed with internal screw threads 28, which are engaged by the external threads of adjusting screw 18 (shown in FIG. 1); two holes 30, by which the retainer 14 can be rotated relative to the spring 12 when connecting the retainer to the spring 18; and a hook 32, which contacts the coil of spring 12 (shown in FIG. 1) that is seated in the helical recess 24 to secure the spring to retainer 14 while the spring is loaded.

Figure 4:
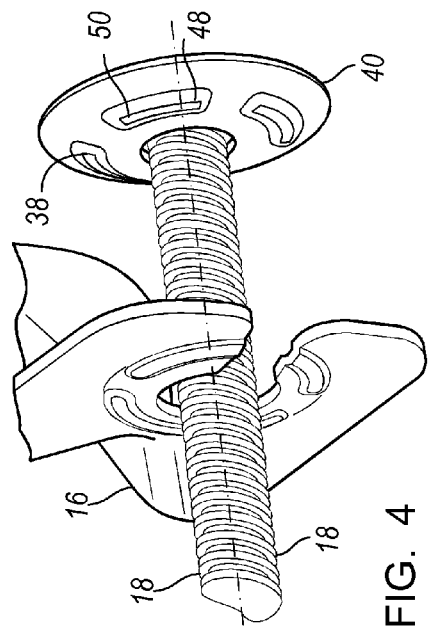
FIG. 4 is a perspective end view showing details of the bracket and screw.
Figure 3:
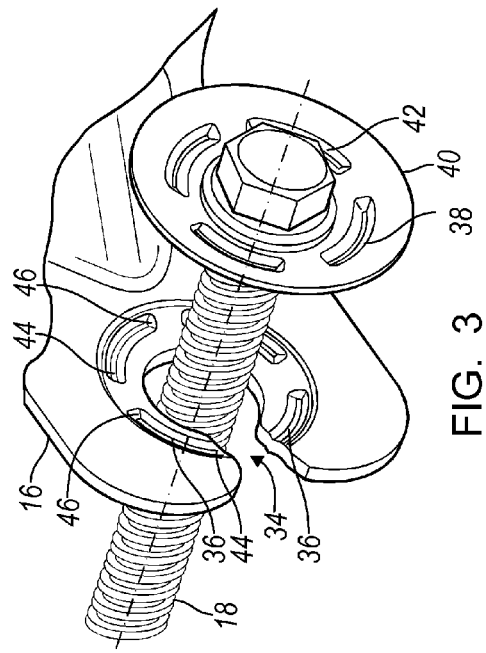
FIG. 3 is a perspective end view showing the screw inserted into the mounting bracket.

As shown in FIGS. 3 and 4, mounting bracket 16 is formed with a slotted hole 34, the slot located and sized to receive the threaded shank of screw 18. Surrounding hole 34 and formed in the concave surface of bracket 16 that faces the head 42 of screw 18 is a series of arcuate tapered recesses 36, which are located and sized to receive arcuate tapered pads 38 formed in the adjacent convex surface of a washer 40. The washer 40 is secured to or formed integrally with the hexagonal head 42 of adjusting screw 18. Each recess 36 has a tapered depth that is deeper at the counterclockwise extremity 44 of the pad and shallower at the clockwise extremity 46. Similarly, each pad 38 has a tapered depth that is deeper at the counterclockwise extremity 48 of the pad and shallower at the clockwise extremity 50.

The term "formed integrally" means that washer 40 and screw head 42 are either formed as a single component without a connection joining the washer and screw head, or the washer and screw head are joined together with a connection that produces a single component.

When the screw 18 has right-hand threads and its head 42 is rotated clockwise, the pads 38 of washer 40 slide out of engagement with the recesses 36 of bracket 16, and the spring 12 (shown in FIG. 1) extends axially until retainer 14 (shown in FIG. 1) contacts the bracket, as shown in FIG. 1. When the spring is extended and the mechanism is in the position shown in FIG. 1, the pads 38 become reseated in the recesses 36, thereby preventing the screw 18 from rotating counterclockwise due to contact between the deeper end 48 of each pad with the deeper end 44 of the corresponding recess. This contact forms a stop that prevents or at least resists rotation of the screw 18 in a rotary direction that causes the spring 12 to contract.

Figure 5:
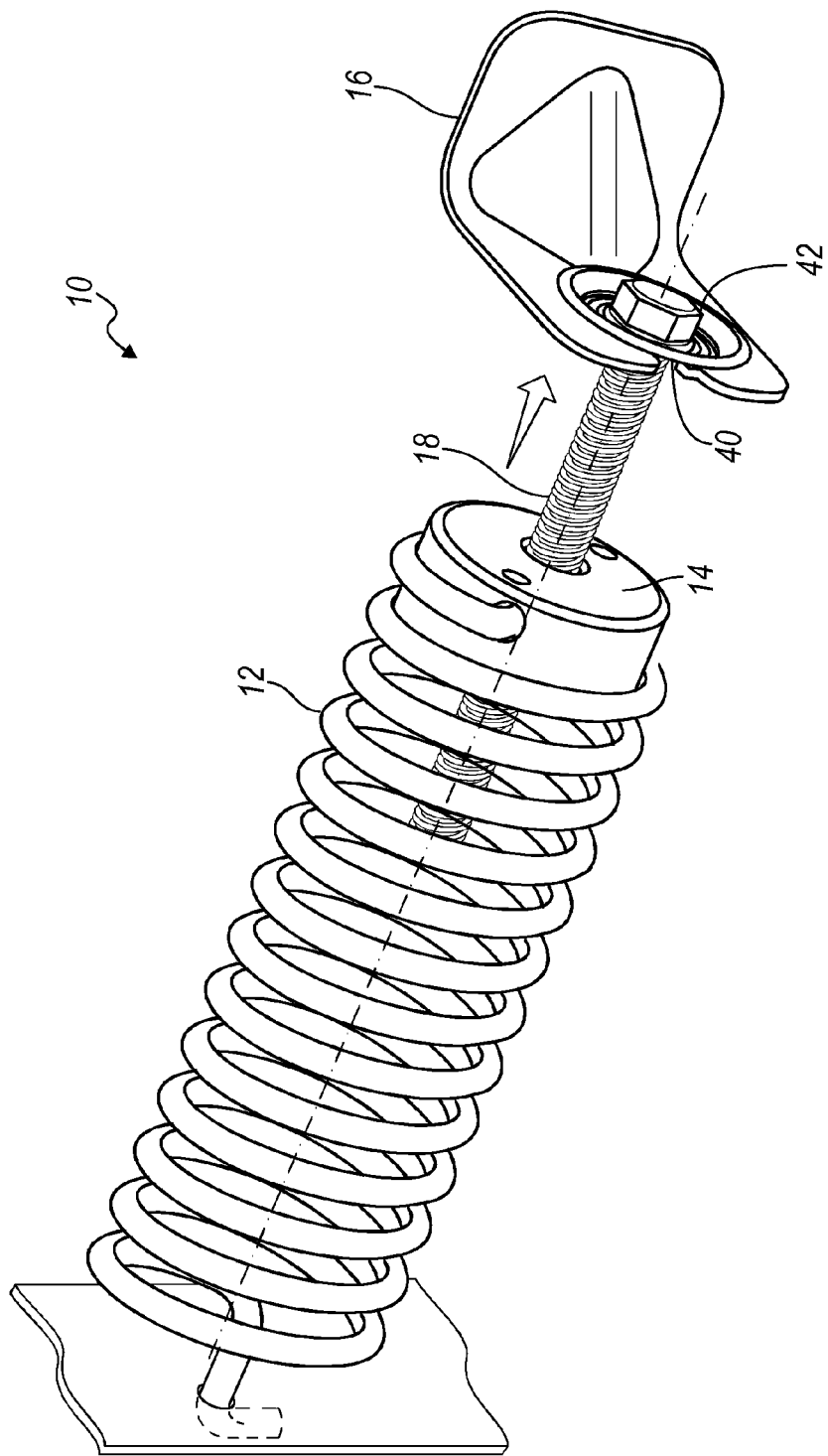
FIG. 5 is a perspective side view showing a contracted spring connected to the tensioning mechanism.

FIG. 5 illustrates the method for installing the spring 12. An operator connects one end of a contracted spring 12 to the hinge strap (not shown) and the opposite end is secured to the spring tensioning mechanism 10. Mounting bracket 16 is secured to the vehicle body. The operator uses a powered nut runner or other such driver to rotate the adjusting screw 18, which causes retainer 14 to be drawn toward bracket 16 and spring 12 to extend as the screw 18 rotates, thereby loading the deck lid hinge with a spring counter balance force.

While certain embodiments of the present invention have been described in detail, those familiar with the art to which this invention relates will recognize various alternative designs and embodiments for practicing the invention as defined by the following claims.

What is claimed is:

1. A spring installation mechanism, comprising:
   a bracket fixed against displacement;
   a spring extending along an axis and including a first end and a second end, the second end being fixed against displacement;
   a retainer secured to the first end and including helical threads; and
   a screw including a shank having helical threads engaged with the threads of the retainer, axial displacement of the screw toward the retainer limited by contact with the bracket, said contact permitting rotary displacement of the screw relative to the retainer and the spring; and
   wherein the bracket is formed with a hole located and sized to receive a threaded shank of the screw, and the bracket includes arcuate recesses surrounding the hole; and the screw includes a washer formed integrally with a head of the screw, and the screw includes arcuate pads, each pad being adapted to engage one of the recesses.

2. The mechanism of claim 1, wherein the retainer further comprises:
   a cylinder extending along the axis; and
   a concave, helical recess formed in the outer surface of the cylinder adapted to receive helical coils of the spring in the recess.

3. The mechanism of claim 1, wherein the retainer further comprises:
   an axially extending projection formed with internal screw threads that are engaged by external threads of the screw.

4. The mechanism of claim 1, wherein the retainer further comprises:
   a cylinder extending along the axis;
   a concave, helical recess formed in the outer surface of the cylinder adapted to receive helical coils of the spring; and
   a projection extending from the cylinder and adapted to contact the spring when the spring is located in the recess.

5. The mechanism of claim 1, wherein:
   each recess of the bracket is formed in a concave surface of bracket that faces a head of the screw, and has a tapered depth that varies along a length of the recess; and
   each pad is formed in a convex surface of the washer and has a tapered depth that varies along a length of the pad.

6. The mechanism of claim 5, wherein the tapered depth of each pad and the tapered depth of each recess permit the pads to disengage from the recesses when the screw is rotated in a direction that causes the spring to extend.

7. The mechanism of claim 5, wherein engagement of the pads with the recesses tends to prevent rotation of the screw in a rotary direction that causes the spring to contract.

8. A spring installation mechanism, comprising:
   a bracket fixed against displacement;
   a tension spring extending along an axis and including a first end and a second end, the second end being fixed against displacement;
   a retainer secured to the first end; and
   a screw including a threaded shank engaged with the retainer, a head contacting the bracket, said contact permitting rotary displacement of the screw relative to the retainer and the spring in a direction that extends the spring; and
   wherein the bracket is formed with a hole located and sized to receive a threaded shank of the screw, and the bracket includes arcuate recesses surrounding the hole; and the screw includes a washer secured to a head of the screw, and the screw includes arcuate pads, each pad being adapted to engage one of the recesses.

9. The mechanism of claim 8, wherein the retainer further comprises:
   cylinder extending along the axis; and
   a concave, helical recess formed in the outer surface of the cylinder adapted to receive helical coils of the spring in the recess.

10. The mechanism of claim 8, wherein the retainer further comprises:
    an axially extending projection formed with internal screw threads that are engaged by external threads of the screw.

11. The mechanism of claim 8, wherein the retainer further comprises:
    a cylinder extending along the axis;
    a concave, helical recess formed in the outer surface of the cylinder adapted to receive helical coils of the spring; and
    a projection extending from the cylinder and adapted to contact the spring when the spring is located in the recess.

12. The mechanism of claim 8, wherein:
    each recess of the bracket is formed in a concave surface of bracket that faces the head of the screw, and has a tapered depth that varies along a length of the recess; and
    each pad is formed in a convex surface of the washer and has a tapered depth that varies along a length of the pad.

13. The mechanism of claim 12, wherein the tapered depth of each pad and the tapered depth of each recess permit the pads to disengage from the recesses when the screw is rotated in a direction that causes the spring to extend.

14. The mechanism of claim 12, wherein engagement of the pads with the recesses tends to prevent rotation of the screw in a rotary direction that causes the spring to contract.

15. A method for installing a spring connected to a motor vehicle, comprising:

securing against displacement a bracket on the vehicle body, the bracket being formed with a hole sized to receive a threaded shank of a screw, and the bracket including arcuate recesses surrounding the hole;

securing against displacement a first end of the spring to a deck lid strap;

connecting a second end of the spring to a retainer having threads;

engaging threads of the screw with threads of the retainer, the screw including a washer secured to a head of the screw and the washer includes arcuate pads, each of the pads configured to engage one of the recesses;

securing the head of the screw against axial displacement toward the retainer by contact of the washer with to the bracket; and rotating the screw in a first direction that draws the retainer toward the bracket and extends the spring, engaging the arcuate pads in the arcuate recesses.

16. The method of claim 15, further comprising drawing the retainer into contact with the bracket.

17. The method of claim 15, each recess of the bracket formed in a concave surface that faces the head of the screw and having a tapered depth that varies along a length of the recess; each pad formed in a convex surface of the washer and having a tapered depth that varies along the length of the pad; and, as the head of the screw is rotated in the first direction, permitting the pads to disengage from the recesses, and wherein the head of the screw is prevented from rotation in an opposite second direction due to engagement of the pads in the recesses.

\* \* \* \* \*